(12) United States Patent
Smith (10) Patent No.: US 9,313,945 B2
(45) Date of Patent: Apr. 19, 2016

(54) VEGETATION TREATMENT SYSTEM

(71) Applicant: HELENA HOLDING COMPANY, Wilmington, DE (US)

(72) Inventor: Jason Roland Smith, Ashland, IL (US)

(73) Assignee: HELENA HOLDING COMPANY, Wilmington, DE (US)

( * ) Notice: Subject to any disclaimer, the term of this patent is extended or adjusted under 35 U.S.C. 154(b) by 170 days.

(21) Appl. No.: 13/962,078

(22) Filed: Aug. 8, 2013

(65) Prior Publication Data

US 2015/0041572 A1 Feb. 12, 2015

(51) Int. Cl.
| | |
|---|---|
| *A01C 3/06* | (2006.01) |
| *A01C 15/00* | (2006.01) |
| *A01C 15/12* | (2006.01) |
| *A01C 15/16* | (2006.01) |
| *A01C 15/18* | (2006.01) |
| *A01M 9/00* | (2006.01) |

(52) U.S. Cl.
CPC .............. *A01C 15/18* (2013.01); *A01M 9/0069* (2013.01)

(58) Field of Classification Search
CPC ........ A01C 15/00; A01C 15/12; A01C 15/16; A01C 15/18; A01C 7/166; A01C 3/066; A01C 3/06; A01C 3/063; A01M 9/0069; A01N 25/00; B05B 7/1401
USPC ......... 239/650, 667, 652, 661, 682, 675, 681, 239/690; 238/650, 652, 651
See application file for complete search history.

(56) References Cited

U.S. PATENT DOCUMENTS

| | | | | |
|---|---|---|---|---|
| 657,419 | A * | 9/1900 | Jager .............................. | 239/650 |
| 971,436 | A * | 9/1910 | Funk ..................... | B02C 18/225 |
| | | | | 198/642 |
| 1,213,554 | A * | 1/1917 | Synck .................... | B65G 33/00 |
| | | | | 198/608 |
| 1,668,516 | A * | 5/1928 | Litchfield .............. | A01C 15/16 |
| | | | | 239/664 |
| 2,099,369 | A * | 11/1937 | Lutz ....................... | A01C 17/00 |
| | | | | 239/657 |
| 2,350,476 | A * | 6/1944 | Richey ................... | A01C 15/00 |
| | | | | 239/650 |
| 2,511,514 | A * | 6/1950 | Rosselot ................ | A01C 15/16 |
| | | | | 222/310 |
| 2,673,741 | A * | 3/1954 | Durand .................. | A01C 15/16 |
| | | | | 222/330 |
| 2,743,932 | A * | 5/1956 | Wester ................... | A01C 15/18 |
| | | | | 198/313 |
| 2,871,021 | A * | 1/1959 | Baldridge ................ | A01C 3/06 |
| | | | | 198/642 |
| 3,048,304 | A * | 8/1962 | Polzin .................... | A01C 15/16 |
| | | | | 222/162 |
| 3,186,460 | A * | 6/1965 | Frederick ................ | A01F 12/40 |
| | | | | 100/906 |
| 3,228,310 | A * | 1/1966 | Cartwright .................... | 404/110 |
| 3,529,870 | A * | 9/1970 | Woten ..................... | E04F 21/12 |
| | | | | 406/135 |
| 3,756,509 | A * | 9/1973 | Hamnes ................ | E01C 19/202 |
| | | | | 239/661 |
| 4,705,220 | A * | 11/1987 | Gandrud et al. .............. | 239/654 |
| 4,978,252 | A * | 12/1990 | Sperber .............. | B65G 53/4633 |
| | | | | 198/532 |
| 5,549,414 | A * | 8/1996 | Boxall .................... | E01C 23/06 |
| | | | | 239/675 |
| 6,149,080 | A * | 11/2000 | Stout ...................... | A01C 7/123 |
| | | | | 239/682 |

OTHER PUBLICATIONS

Photo of a similar device from Nov. 2012.

* cited by examiner

*Primary Examiner* — Arthur O Hall
*Assistant Examiner* — Joseph A Greenlund
(74) *Attorney, Agent, or Firm* — Drinker Biddle & Reath LLP (57) ABSTRACT

A vegetation treatment system includes at least one distribution apparatus, a transport such as a vehicle, having a receptacle for housing a vegetation treatment, and a funnel that facilitates passage of the vegetation treatment from the receptacle to each distribution apparatus. When in use, the vegetation treatment system may be used by an operator to target specific areas for vegetation treatment, particularly where treatments are applied to bedded crops. Each distribution apparatus is mounted onto the transport for application of the treatment. The system also includes one or more mechanisms that articulate each distribution apparatus such that they can be stowed.

18 Claims, 8 Drawing Sheets

VEGETATION TREATMENT SYSTEM

BACKGROUND OF THE INVENTION

1. Field

The present disclosure relates to systems used to treat vegetation, and particularly systems used for distribution of treatments onto vegetation.

2. Background

For many types of vegetation, planting on raised beds results in improved drainage conditions. Planting on raised beds is also known to reduce disease development. Although planting on raised beds offers these and other advantages, planting in this manner can complicate the incorporation of vegetation treatments.

Incorporating herbicides, pesticides, fertilizers, and other types of vegetation treatments in bedded crops can be challenging. Building beds after incorporation can increase herbicide application rate and depth of incorporation, for example. For some herbicides to work effectively, a raised bed is built first then herbicide is applied to beds. Fields where beds are located, however, are often irregularly shaped and have rows which are spaced widely apart. The irregularly of fields and row spacing for bedded crops can pose several problems when applying vegetation treatments. The length of beds to be treated can also prevent proper application and incorporation of vegetation treatments.

Considering the various issues encountered when treating bedded crops, there is a need for improved vegetation treatment systems. The invention disclosed herein fulfills this need and provide further related advantages, as described below.

SUMMARY

The present invention is directed to a vegetation treatment system, including at least one distribution apparatus, a transport such as a vehicle, having a receptacle for housing a vegetation treatment, and a funnel that facilitates passage of the vegetation treatment from the receptacle to each distribution apparatus. When in use, the vegetation treatment system may be used by an operator to target specific areas for vegetation treatment, particularly where treatments are applied to bedded crops. Each distribution apparatus is mounted onto the transport for application of the treatment. The system also includes one or more mechanisms that articulate each distribution apparatus such that they can be stowed.

A more complete understanding of the vegetation treatment system will be afforded to those skilled in the art, as well as a realization of additional advantages and objects thereof, by consideration of the following detailed description. Reference will be made to the appended sheets, which will first be described briefly.

BRIEF DESCRIPTION OF THE DRAWINGS

The drawings described herein after for illustrative purposes and are not intended to limit the scope of the present disclosure. Like element numerals may be used to indicate like elements appearing in one or more of the drawings. In the drawings.

DETAILED DESCRIPTION

Turning in detail to the drawings, FIGS. 1-3B show one configuration of a vegetation treatment system 10. The system 10 includes two distribution apparatuses 12a, 12b and a transport 14. The transport 14 is preferably a mobile unit or vehicle 16 suitable for all-terrain travel, as well as supporting and transporting distribution apparatuses 12 over fields 13 with various terrain profiles. Fields may include crops 23, which are bedded and planted in rows, as particularly shown in FIG. 1. Preferably, at least two distribution apparatuses are configured to extend to a total length of about 32 feet to about 40 feet. However, the distribution apparatuses can be configured to longer lengths. The transport 14 includes a receptacle 18 such as a hopper, a cab section 20, and a chassis 22 mounted to the receptacle 18 and wheels 24. The cab section includes seating for at least one operator and other controls used for vehicle steering and control of the distribution apparatus.

The transport 14 is of sufficient size to allow for mounting of the distribution apparatuses 12a, 12b and the receptacle 18. Preferably, the transport 14 is configured for all-terrain movement to allow for movement along pathways provided between bedded crops. In many cases, these pathways are unpaved and uneven. As such, the vehicle is provided with various modes of steering for maneuverability. Vehicles which are suitable for use with the vegetation treatment system include those manufactured by the AgForce, Inc., AgCo and Highway Equipment Company (HECO). Two types of vehicles particularly suited for use in the system are the New Leader G4 L3020 and the AgForce FL3024.

Figure 3A:
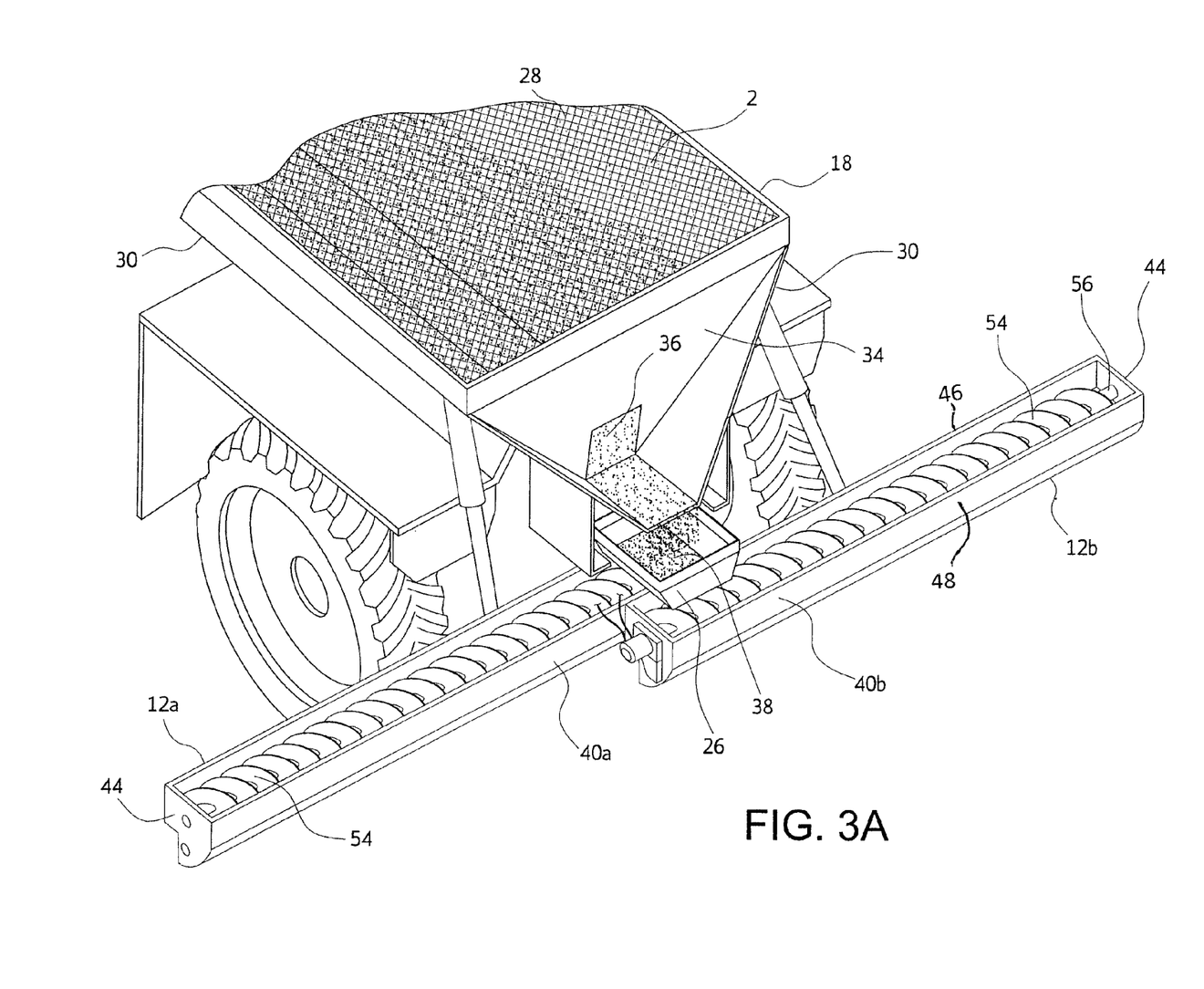
FIG. 3A is a top perspective view of a vegetation treatment system.

Referring to FIG. 3A, the receptacle 18 is configured to receive a vegetation treatment 2 (FIG. 3A) and facilitate passage of the treatment 2 to a funnel 26 or other type of channeling device. Vegetation treatments can include mixtures of natural and chemical-based materials that assist with vegetation growth and disease prevention. Such materials therefore include pesticides, fertilizers, fungicides, and/or herbicides, which can be used for treatment of vegetation. Some types of treatment may include chicken pellets, copper sulfate, zinc sulfate, manganese sulfate, ferrous sulfate, pelletized lime, and Hydra Hume D.G. (A proprietary product manufactured and sold by Helena Chemical Company). This listing of treatment materials, however, is merely representative.

The receptacle 18 includes an open top 28, sidewalls 30, a front wall 32 (FIG. 1), a back wall 34, and an exit port 36 that facilitates passage of the treatment 2 into the funnel 26. In this system configuration, the funnel 26 is coupled to the back wall 34 of the receptacle 18 to further aid in funneling of the vegetation treatment 2 into each distribution apparatus 12a, 12b. The funnel 26 includes an aperture 38 having sufficient width and length such that vegetation treatment can channel into the inner ends 40a, 40b of each distribution apparatus.

Figure 1:
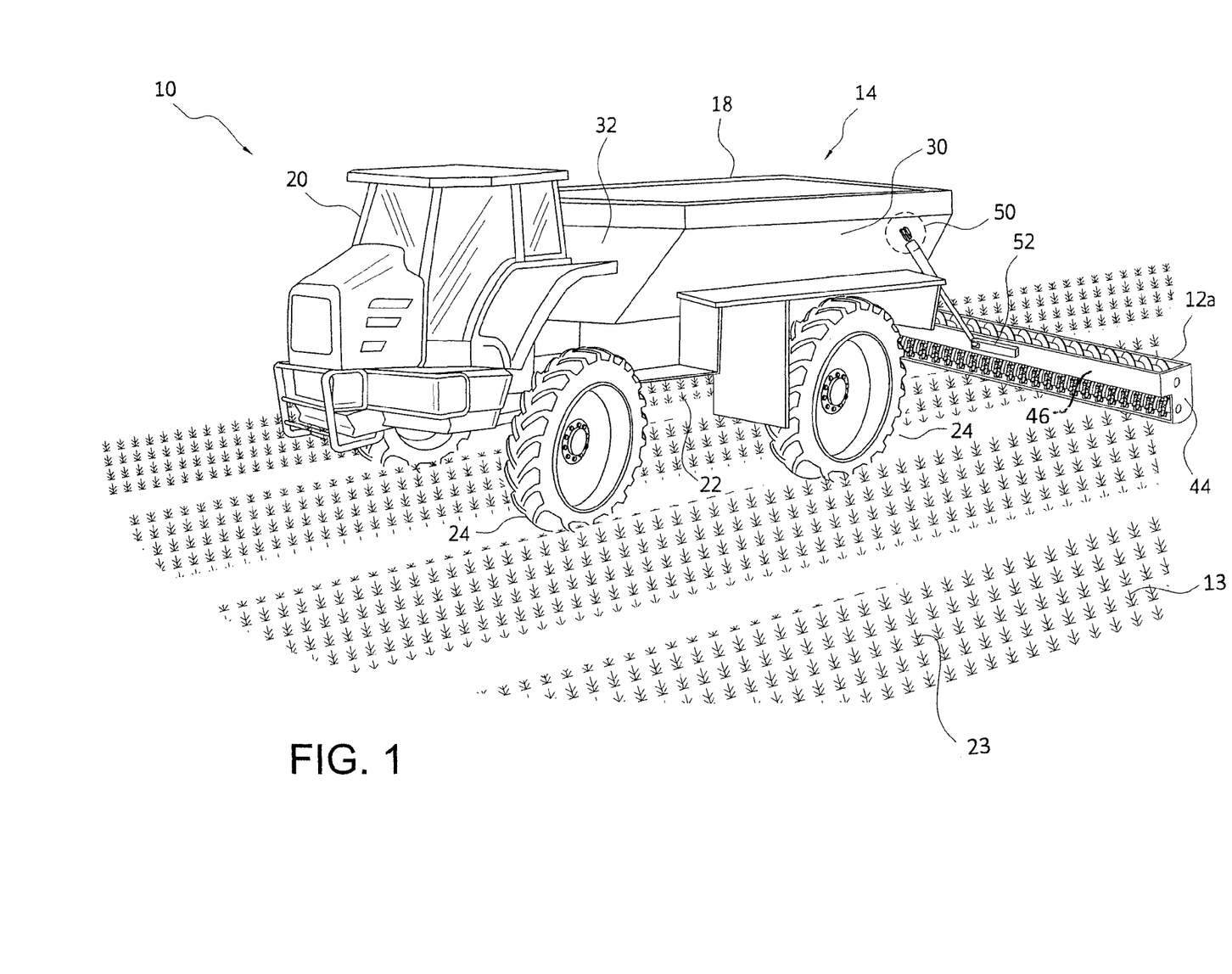
FIG. 1 is a perspective view of a vegetation treatment system positioned over bedded crops.
Figure 2:
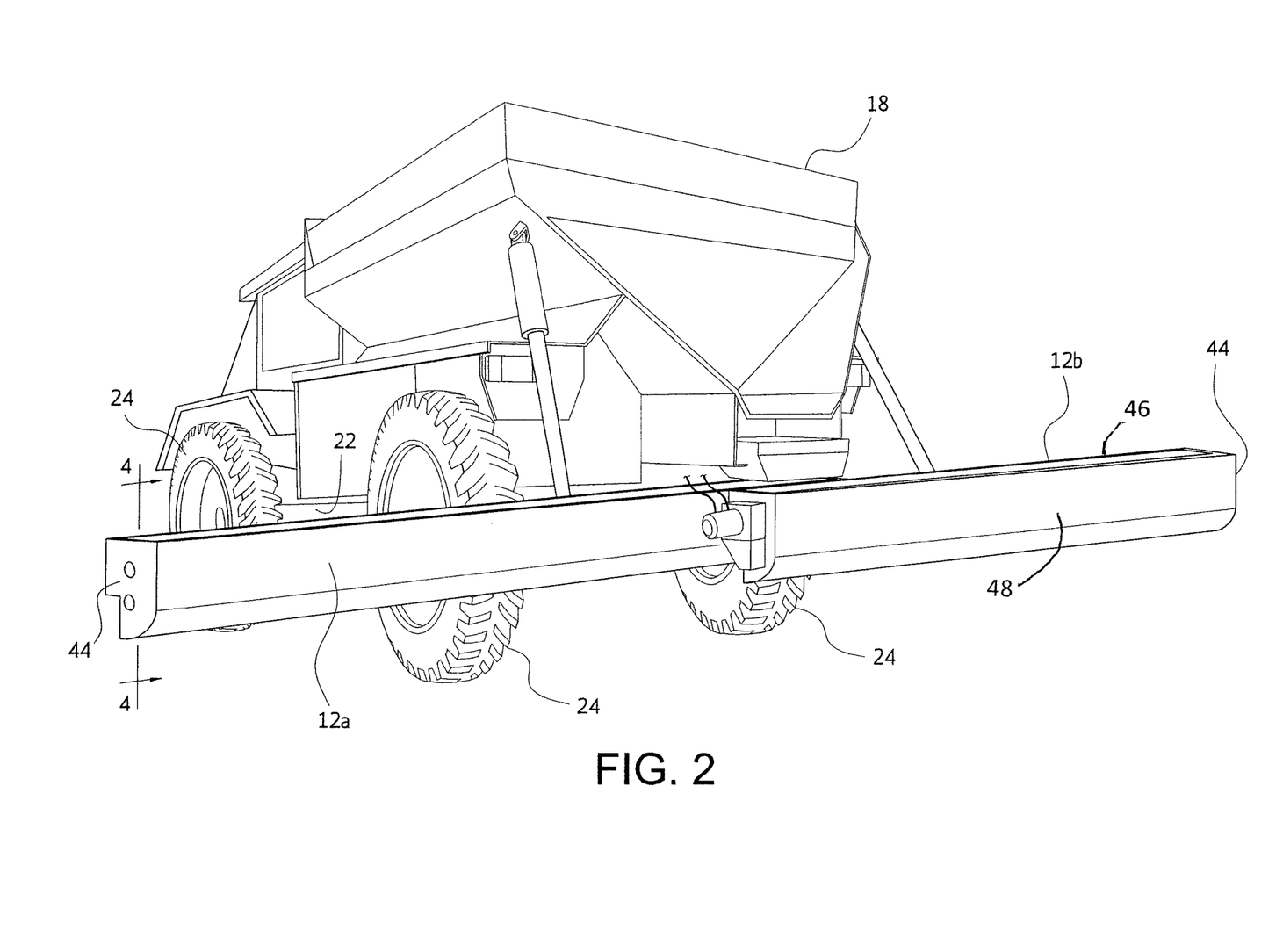
FIG. 2 is a rear perspective view of a vegetation treatment system.
Figure 3B:
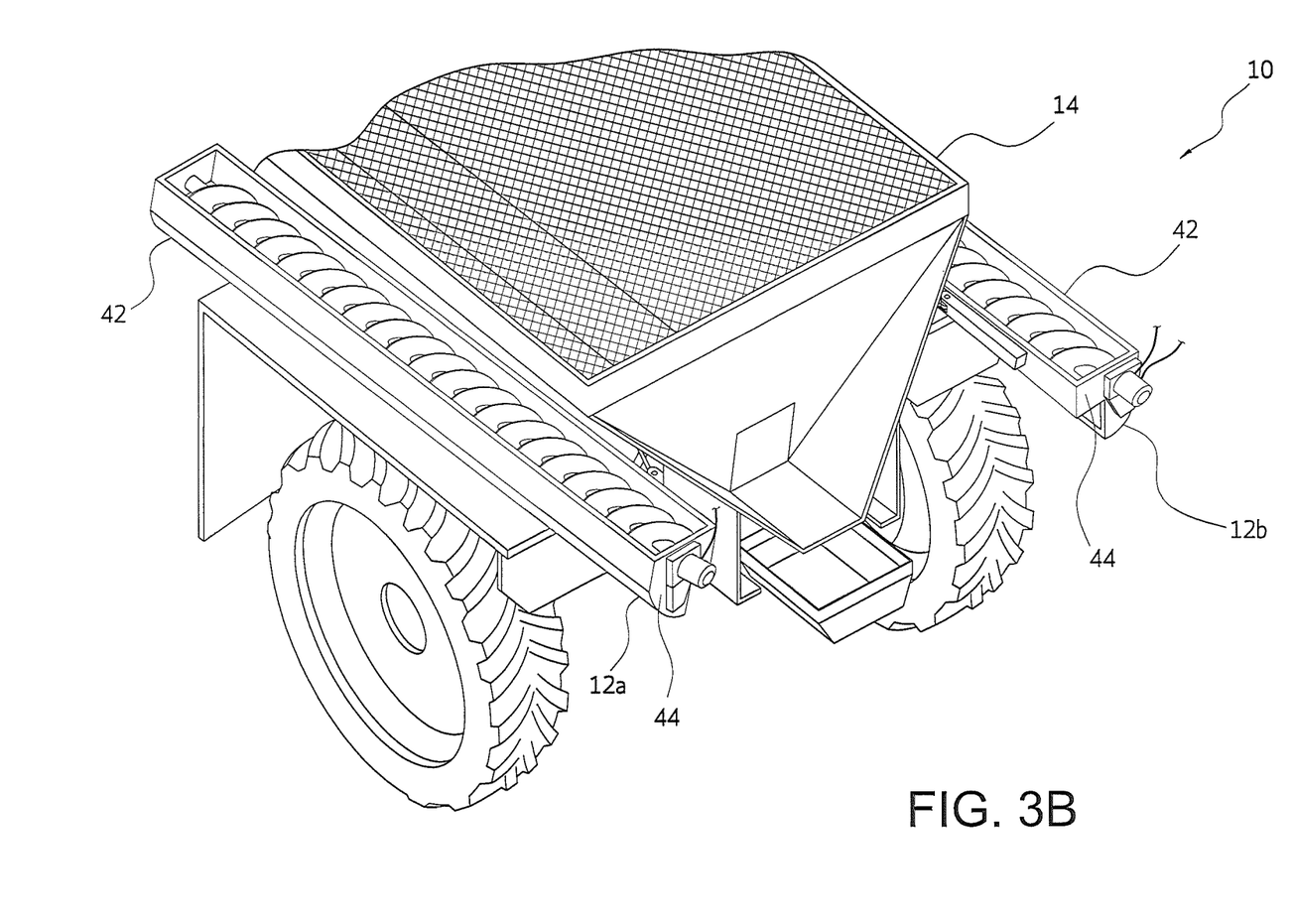
FIG. 3B is another top perspective view of a vegetation treatment system.

Each distribution apparatus 12a, 12b includes a housing 42 configured as a split U-trough. The housing has an open top 43, but may include covers (now shown) to protect the distribution apparatuses during storage. The housing includes sidewalls 44, a front distribution wall 46 and a rear distribution wall 48. The front distribution wall 46 is coupled to one or more areas 50 on the transport 14, using one or more connectors 52. See FIG. 1. The connectors 52 are preferably coupled to controls within the cab section 20 such that an operator (not shown) can control the positioning of the distribution apparatuses 12a, 12b for storage purposes. FIGS. 2 and 3A show how the distribution apparatuses 12a, 12b may be positioned for vegetation treatment. FIG. 3B shows how the distribution apparatuses are positioned when stowed. Each distribution apparatus is configured to pivot against the chassis 22 of the transport 14.

Figure 4:
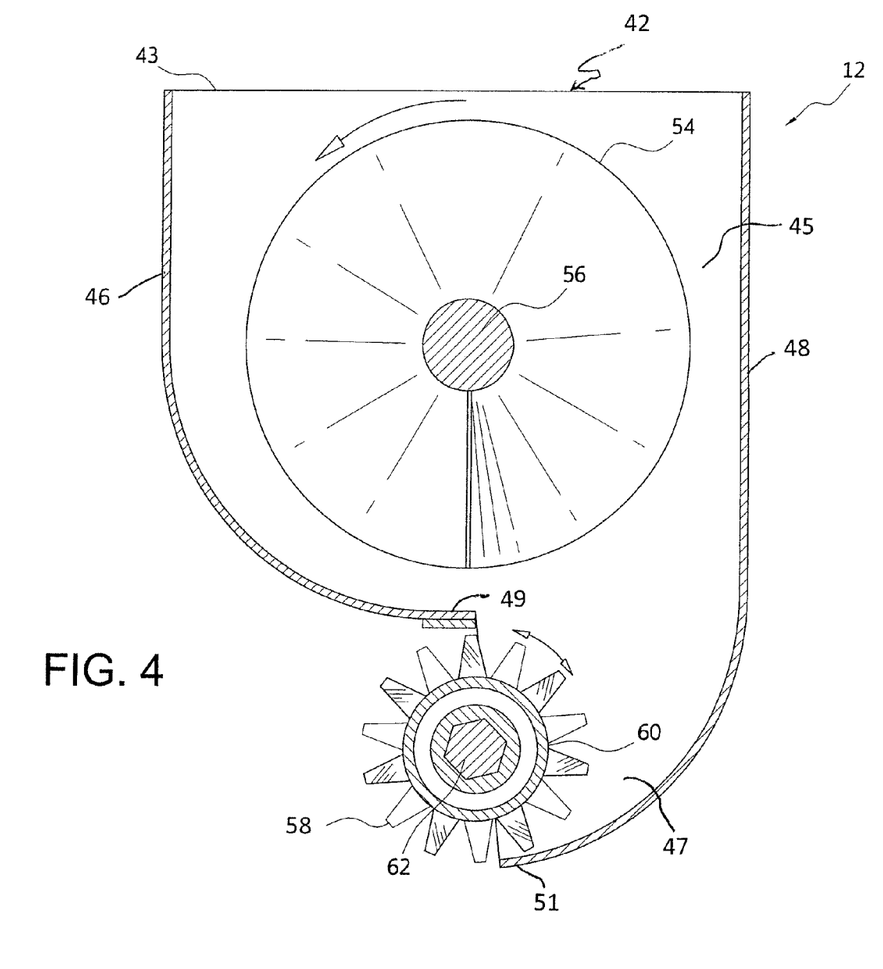
FIG. 4 is a section view of a distribution apparatus shown in FIG. 2 taken along line 4-4.
Figure 5A:
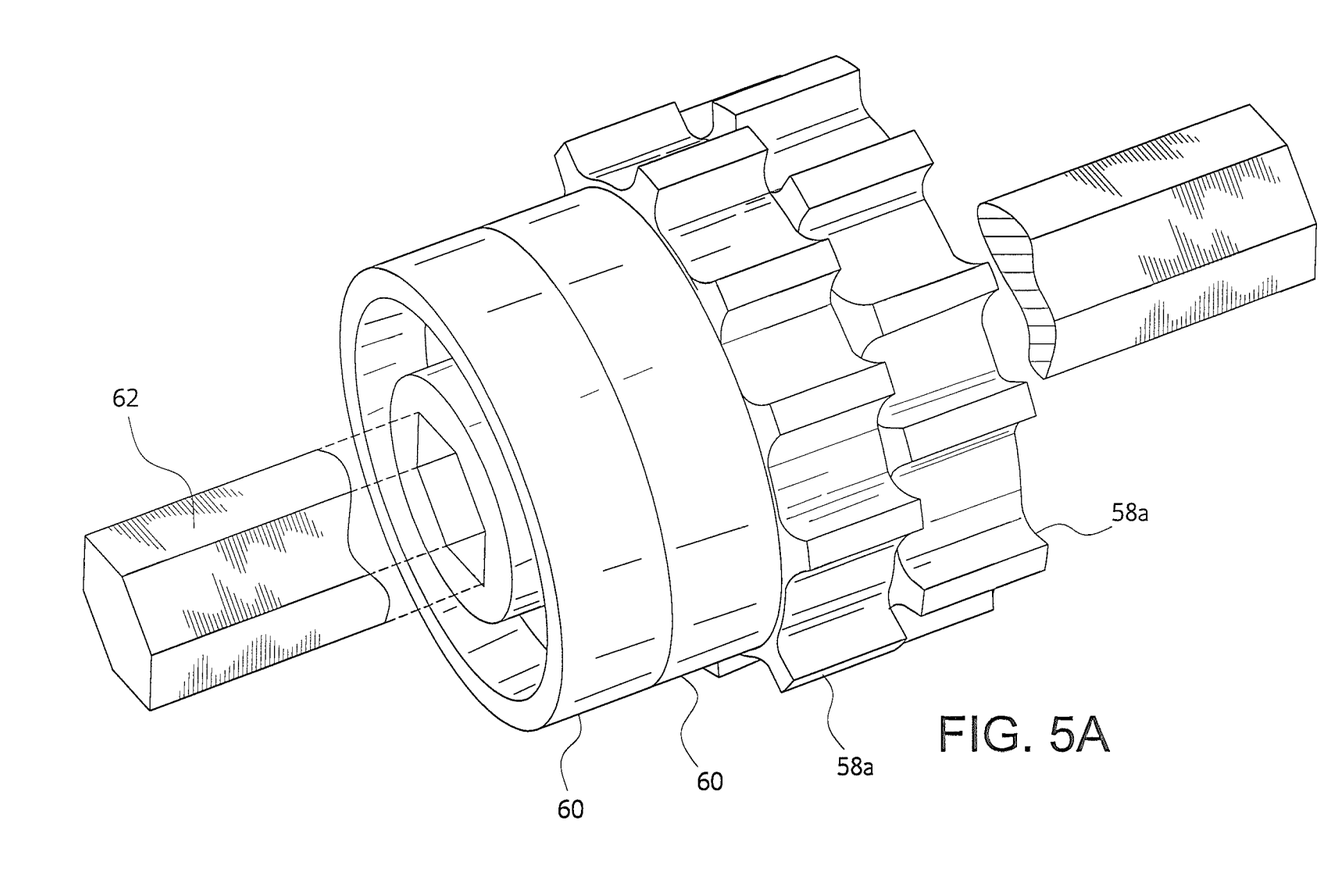
FIG. 5A is a partially exploded view of a lower shaft, spacers, and metering wheels for use in a distribution apparatus.
Figure 5B:
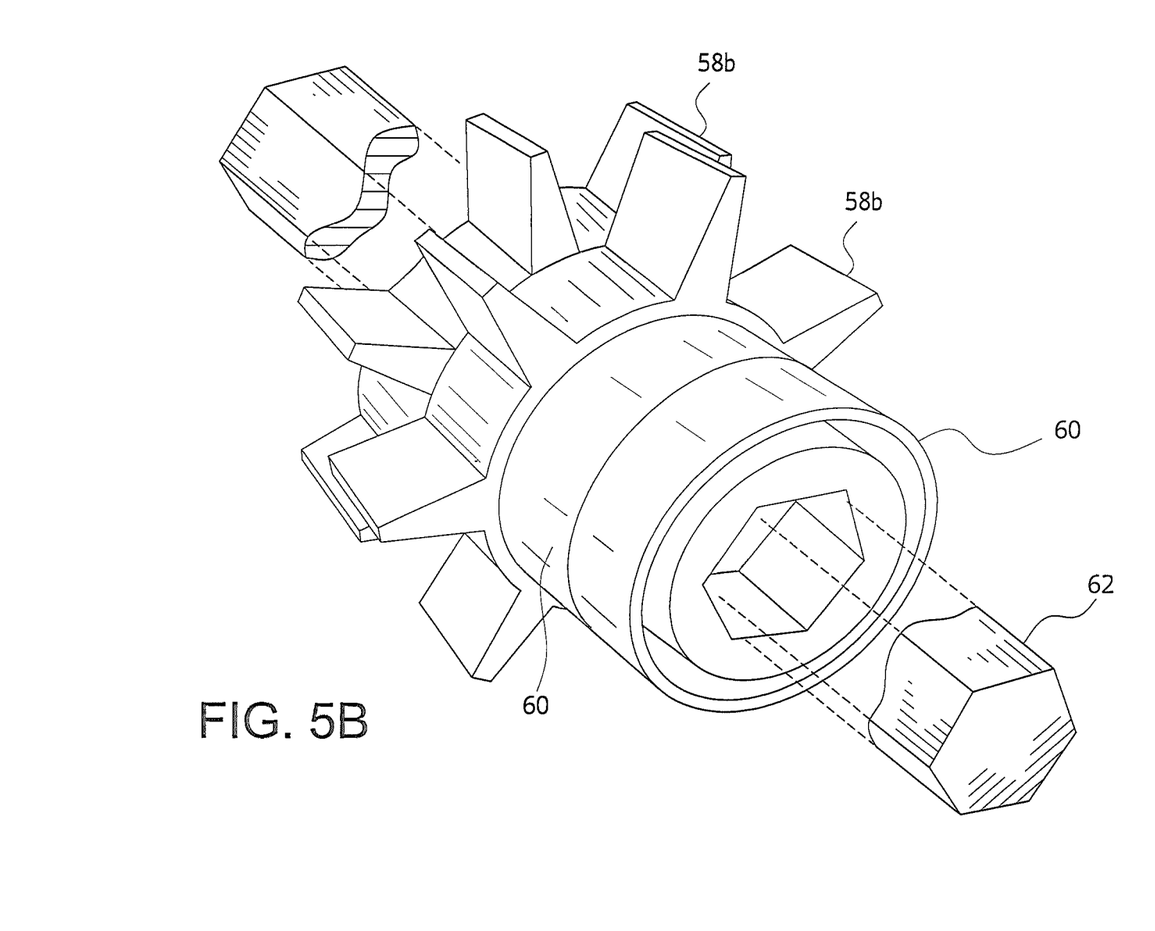
FIG. 5B is a partially exploded view of a lower shaft, spacers, and metering wheels of another type for use in a distribution apparatus.
Figure 6:
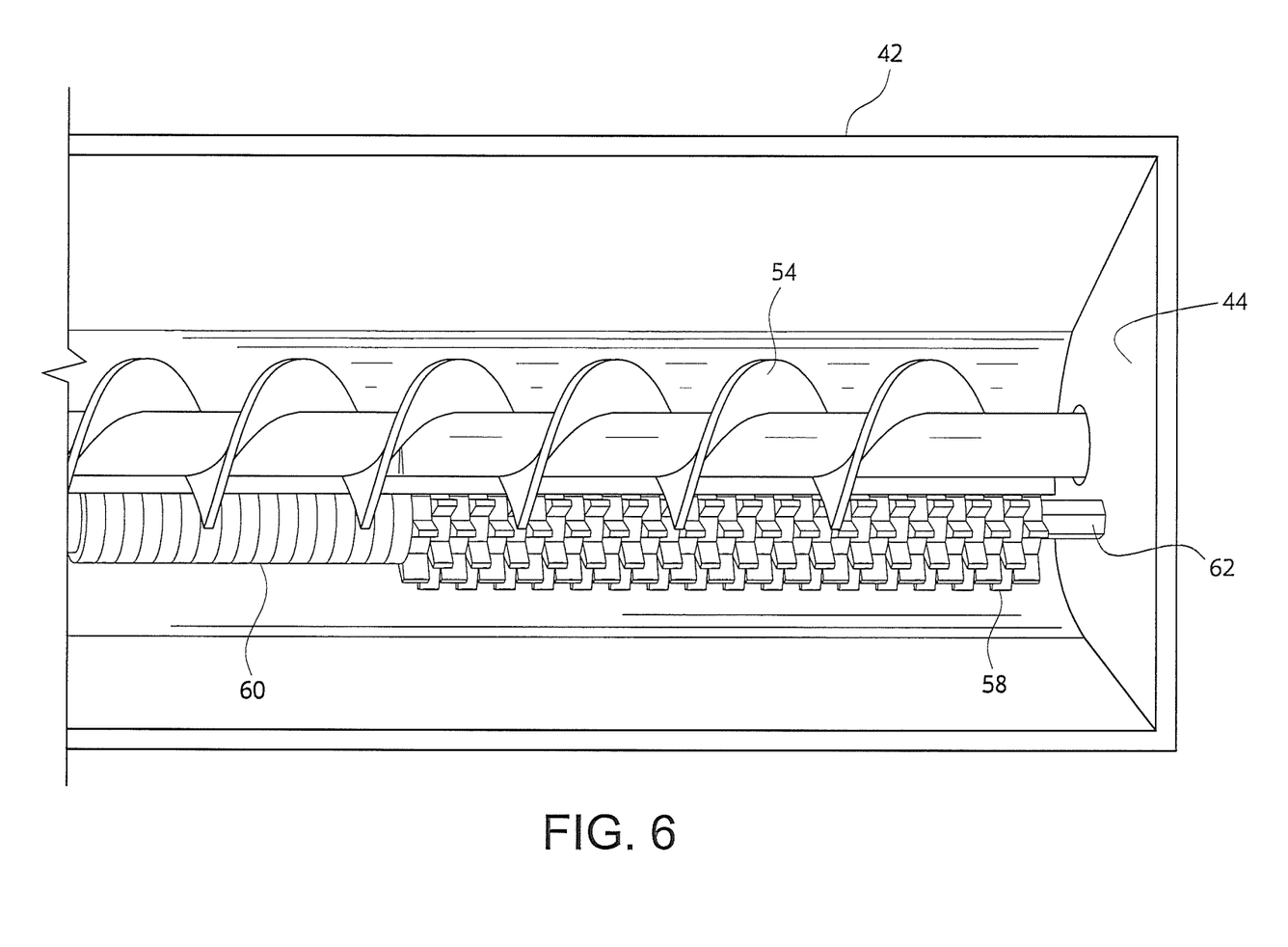
FIG. 6 is a top view of a distribution apparatus.

FIGS. 4-6 show the interior components of an exemplary distribution apparatus 12. Positioned within the housing 42 is an auger 54 having an upper shaft 56. The auger is configured to rotate counter-clockwise and prepare vegetation treatments for metering. The auger preferably has an outer effective diameter ranging from about 5 inches to about 6 inches. Preferably, the auger is driven by a hydraulic motor with its speed being be controlled by a pwm valve and 360 pulse per resolution encoder such as those provided in the Raven CAN control system.

The housing 42 is configured as a split U-trough and contains a plurality of metering wheels 58 and spacers 60 disposed on a lower shaft 62. Metering wheels include those manufactured by the Gandy Company. Preferably the metering wheels are about 2½ inches to about 3½ in diameter and about ¾ inches to about 1½ wide. The wheels will rotate to meter and disperse the vegetation treatment. FIGS. 5A and 5B show alternative types of metering whets 58a, 58b. Preferably the metering wheels 58 are stacked along a define length of the lower shaft. FIG. 6 shows an exemplary arrangement of metering wheels and spacers such that target application of the vegetation treatment can be achieved. According to one possible arrangement, the metering wheels will extend up to a length of about 68 inches and then spacers will extend along the length of the shaft for about 12 inches. The lower shaft is preferably hydraulically driven with its speed being controlled by a servo valve and 360 pulse encoder such as those provided in the Raven CAN (closed area network) control system. Use of this type of control system is for sufficient control of the rate in which vegetation treatments are dispersed.

As shown in FIG. 4 the distribution apparatus comprises a housing 42 having a top 43. The housing 42 has an upper section 45 and a lower section 47 in flow communication with each other. As previously noted the housing is configures as a split U-trough with the upper section 45 located between the front distribution wall 46 and the rear distribution wall 48 as well as the side walls 44, 44 shown in FIG. 3A. As also shown in FIG. 4 the front wall 46 has an inwardly extending wall segment 49 below the top 43. The rear wall 48 has an inwardly extending lower wall segment 51 below the segment 49. The metering wheels 58 and its shaft 62 are located in the space between the wall segment 49 and the wall segment 51 with the metering wheels 58 exposed from the housing. As previously noted upper shaft 56 is driven by a hydraulic motor controlled by a pwm valve while lower shaft 62 is driven by a motor controlled by a servo valve. Thus, separate motors are used which would independently rotate both shafts. As shown in FIG. 2 the two distribution apparatuses 12a and 12b have side by side ends for jointly receiving the vegetation treatment. As also shown in FIG. 2 each distribution apparatus extends laterally beyond the transport. As shown in FIG. 6 the auger shaft and the metering wheels shaft are parallel to each other.

The receptacle is manufactured from one or more materials, which are generally chemically compatible with the vegetation treatment. All other system elements disclosed herein, which are configured to contact a vegetation treatment, are preferably manufactured from one or more materials generally chemically compatible with the vegetation treatment. These elements may also be innately chemically and weather resistant or coated with one or more materials that provide substantial weather resistance.

While embodiments of this invention have been shown and described, it will be apparent to those skilled in the art that many more modifications are possible without departing from the inventive concepts herein. The invention, therefore, is not to be restricted except in the spirit of the following claims.

The invention claimed is:

1. A vegetation treatment system comprising a transport for movement over a vegetation treatment area, said transport including a receptacle for vegetation treatment, at least one distribution apparatus, said receptacle having discharge structure to feed the vegetation treatment to said distribution apparatus, at least one connector coupling said distribution apparatus to said transport, said distribution apparatus comprising a housing having a top for receiving the vegetation treatment, said housing having an upper section and a juxtaposed lower section in direct flow communication with each other, a horizontal upper shaft in said upper section, an auger mounted on said upper shaft, a horizontal lower shaft in said lower section, a plurality of vertically disposed metering wheels and a plurality of spacers mounted on said lower shaft, said metering wheels being partially within said housing and partially exposed from said housing, said housing being configures as a split U-trough, said upper section being located between a front distribution wall and a rear distribution wall and side walls of said housing, one of said front wall and said rear wall having an upper section inwardly extending lower wall segment below said top and terminating inwardly of the other of said front wall and said rear wall to form a distribution opening therebetween which communicates directly with said lower section having said metering wheels, said other of said front wall and said rear wall having a lower section inwardly extending lower wall segment extending in an opposite direction from and below said lower wall segment of said upper section, said metering wheels being located in the space between said lower wall segment of said upper section and said lower wall segment of said lower section, and the spacing between said upper section lower wall segment and said lower section lower wall segment comprising a discharge opening whereby vegetation treatment fed from said receptacle to said auger is deposited by said rotating auger directly to said metering wheels from said distribution opening and is discharged by said rotating metering wheels from said discharge opening for application to a vegetation bed.

2. The system of claim 1 wherein said metering wheels include outwardly extending metering members circumferentially spaced from each other around each metering wheel whereby each metering wheel forms a toothed structure.

3. The system of claim 2 wherein said distribution apparatus is selectively movable to and from a vegetation treatment position and a stowed position.

4. The system of claim 3 wherein said distribution apparatus is movable by being pivotally mounted to said transport to be pivoted against a side of said transport in said stowed position and to be pivoted in a position perpendicular to said transport in said vegetation treatment position.

5. The system of claim 3 wherein there are two of said distribution apparatuses.

6. The system of claim 5 wherein said distribution apparatuses have side by side adjacent ends for jointly receiving the vegetation treatment.

7. The system of claim 6 wherein at least some of said metering wheels are adjacent each other without any intervening spacers.

8. The system of claim 7 wherein said upper shaft and said lower shaft are parallel to each other.

9. The system of claim 2 wherein said distribution apparatus is selectively movable to and from a vegetation treatment position and a stowed position.

10. The system of claim 9 wherein said distribution apparatus is movable by being pivotally mounted to said transport to be pivoted against a side of said transport in its stowed position and to be pivoted in a position perpendicular to said transport in its vegetation treatment position.

11. The system of claim 1 said metering wheels being stacked along a length of said lower shaft without any intervening spacers, and said spacers being stacked along a length of said lower shaft to provide a target application of the vegetation treatment.

12. The system of claim 1 wherein there are two of said distribution apparatuses.

13. The system of claim 12 wherein said distribution apparatuses have side by side adjacent ends for jointly receiving the vegetation treatment, and each of said distribution apparatuses extending laterally beyond said transport when said distribution apparatuses are in their vegetation treatment position.

14. The system of claim 2 wherein said auger is motor driven with a first speed controller, and said lower shaft being motor driven with a second speed controller separate from said first speed controller.

15. The system of claim 2 wherein said plurality of metering wheels comprise a plurality of metering wheels stacked along a portion of said lower shaft without intervening spacers, and said plurality of spacers comprise a plurality of spacers stacked along a further portion of said lower shaft adjacent to said stacked metering wheels and with any intervening metering wheels.

16. The system of claim 1 wherein said plurality of metering wheels comprise a plurality of metering wheels stacked along a portion of said lower shaft without intervening spacers, and said plurality of spacers comprise a plurality of spacers stacked along a further portion of said lower shaft adjacent to said stacked metering wheels and with any intervening metering wheels.

17. The system of claim 1 wherein there are a greater number of said metering wheels that the number of said spacers on said lower shaft.

18. The system of claim 1 wherein said metering wheels cover a greater length of said lower shaft than the length of said lower shaft covered by said spacers.

* * * * *